(12) United States Patent
Popovici et al.

(10) Patent No.: US 6,324,478 B1
(45) Date of Patent: Nov. 27, 2001

(54) SECOND-AND HIGHER-ORDER TRAVELTIMES FOR SEISMIC IMAGING

(75) Inventors: Alexander M. Popovici, Portola Valley; James A. Sethian, San Francisco, both of CA (US)

(73) Assignee: 3D Geo Development, Inc.

( * ) Notice: Subject to any disclaimer, the term of this patent is extended or adjusted under 35 U.S.C. 154(b) by 0 days.

(21) Appl. No.: 09/557,239

(22) Filed: Apr. 24, 2000

Related U.S. Application Data

(60) Provisional application No. 60/133,311, filed on May 10, 1999.

(51) Int. Cl.$^7$ .................................................... G01V 1/28
(52) U.S. Cl. ........................................................ 702/18
(58) Field of Search ................................ 702/14, 18, 17; 367/73

(56) References Cited

U.S. PATENT DOCUMENTS

| | | |
|---|---|---|
| 5,513,150 | 4/1996 | Sicking et al. . |
| 6,018,499 | 1/2000 | Sethian et al. . |
| 6,081,482 | 6/2000 | Bevc . |

OTHER PUBLICATIONS

Bevc, "Imaging Complex Structures with First–Arrival Traveltimes," Technical Program, p. 1189–1192, Society of Exploration Geophysicists (SEG) International Exposition and 65$^{th}$ Annual Meeting, Oct. 8–13, 1995, Houston.

Cao et al., "Finite Difference Solution of the Eikonal Equation using an Efficient, First–Arrival, Wavefront Tracking Scheme," *Geophysics* 59(4):632–643 (Apr. 1994).

Cerveny, "Ray Tracing Algorithms in Three–Dimensional Laterally–Varying Layered Structures," *Seismic Tomography* (ed. G. Nolet), p. 99–133, Reidel Publishing Company, 1987.

Dellinger et al., "Anisotropic Finite–Difference Traveltimes using a Hamilton–Jacobi Solver," Technical Program, p. 1786–1789, Society of Exploration Geophysicists (SEG) International Exposition and 66$^{th}$ Annual Meeting, Nov. 10–15, 1996, Denver.

Fei et al., "Finite–Difference Solutions to the 3–D Eikonal Equation," Technical Program, p. 1129–1132, Society of Exploration Geophysicists (SEG) International Exposition and 65$^{th}$ Annual Meeting, Oct. 8–13, 1995, Houston.

(List continued on next page.)

*Primary Examiner*—Donald E. McElheny, Jr.
(74) *Attorney, Agent, or Firm*—Andrei D. Popovici

(57) ABSTRACT

Seismic traveltimes are computed using a conditional high-order method: the traveltime computation operator is second- or higher-order if enough suitable upwind traveltimes are available, and first-order otherwise. Typically, a first-order operator is employed only around singularities, e.g. corners and cusps; a high-order operator is employed for the vast majority of grid points in the target volume. Selectively switching to first-order makes the method relatively simple and computationally efficient, as compared to a pure high-order method. At the same time, most traveltimes are computed to high-order accuracy. In the preferred embodiment, the traveltime front is selectively advanced at its minimum traveltime grid point, using a finite-difference approximation to the eikonal equation. A narrow band propagation zone is used to advance the finite-difference stencil. Tentative traveltimes for the narrow band adjacent to the traveltime front are computed using the eikonal equation and arranged on a heap. The minimum traveltime (top of the heap) is selected as an accepted traveltime, saved in the output table, and removed from the heap. Tentative traveltimes for all non-accepted grid points neighboring the selected point are then computed/recomputed and put on the heap.

26 Claims, 12 Drawing Sheets

OTHER PUBLICATIONS

Fei et al., "Depth Migration Artifacts Associated with First–Arrival Traveltimes," Technical Program, p. 499–500, Society of Exploration Geophysicists (SEG) International Exposition and 66$^{th}$ Annual Meeting, Nov. 10–15, 1996, Denver.

Fowler, "Finite–Difference Solution of the 3–D Eikonal Equation in Spherical Coordinates," Technical Program, p. 1394–1397, Society of Exploration Geophysicists (SEG) International Exposition and 65$^{th}$ Annual Meeting, Oct. 8–13, 1995, Houston.

Gray, "Efficient Traveltime Calculations for Kirchhoff Migration," *Geophysics* 51(8):1685–1688, Aug. 1986.

Gray et al., "Kirchhoff Migration using Eikonal Equation Traveltimes," *Geophysics* 59(5): p. 810–817, May, 1994.

Kästner, "Accurate Finite–Difference Calculations of Traveltimes and Amplitudes in 3–D," Technical Program, p. 1782–1785, Society of Exploration Geophysicists (SEG) International Exposition and 66$^{th}$ Annual Meeting, Nov. 10–15, 1996, Denver.

Kessler et al., "Mixed–Grid Solution of the 3–D Eikonal Equation," Technical Program, p. 1133–1136, Society of Exploration Geophysicists (SEG) International Exposition and 65$^{th}$ Annual Meeting, Oct. 8–13, 1995, Houston.

Kim, "ENO–DNO–PS: A Stable, Second–Order Accuracy Eikonal Solver," p. 1747–1750, Society of Exploration Geophysicists (SEG) International Exposition and 69$^{th}$ Annual Meeting, Oct. 31–Nov. 5, 1999, Houston.

Kim et al., "3–D Traveltime Computation using Second–Order ENO Scheme," *Geophysics* 64(6): 1867–1876, Nov.–Dec. 1999; published on Geophysics Online on Jul. 21, 1999.

Klimes, "Calculation of the Third and Higher Traveltime Derivatives in Isotropic and Anisotropic Media," p. 1751–1754, Society of Exploration Geophysicists (SEG) International Exposition and 69$^{th}$ Annual Meeting, Oct. 31–Nov. 5, 1999, Houston.

Moser, "Shortest Path Calculation of Seismic Rays," *Geophysics* 56(1):59–67, Jan. 1991.

Nichols, "Maximum Energy Traveltimes Calculated in the Seismic Frequency Band," *Geophysics* 61(1):253–263 (Jan.– Feb. 1996).

Pica, "Fast and Accurate Finite–Difference Solutions of the 3–D Eikonal Equation Parametrized in Celerity," Technical Program, p. 1774–1777, Society of Exploration Geophysicists (SEG) International Exposition and 66$^{th}$ Annual Meeting, Nov. 10–15, 1996, Denver.

Qian et al., "Adaptive Finite Difference Method for Traveltime and Amplitude," p. 1763–1766, Society of Exploration Geophysicists (SEG) International Exposition and 69$^{th}$ Annual Meeting, Oct. 31–Nov. 5, 1999, Houston.

Qian et al., "Upwind Finite Difference Traveltime for Anisotropic Media," p. 1410–1413, Society of Exploration Geophysicists (SEG) International Exposition and 69$^{th}$ Annual Meeting, Oct. 31–Nov. 5, 1999, Houston.

Qin et al., "Finite–Difference Solution of the Eikonal Equation Along Expanding Wavefronts," *Geophysics* 57(3):478–487, Mar. 1992.

Reshef et al., "Migration of Common Shot Gathers," *Geophysics* 51(2):324–331, Feb. 1986.

Riahi et al,. "3–D Interpretation of Reflected Arrival Times by Finite–Difference Techniques," *Geophysics* 59(5):844–849, May 1994.

Schneider, "Robust and Efficient Upwind Finite–Difference Traveltime Calculations in Three–Dimensions," *Geophysics* 60(4):1108–1117, Aug. 1995.

Schneider et al., "A Dynamic Programming Approach to First Arrival Traveltime Computation in Media with Arbitrarily Distributed Velocities," *Geophysics* 57(1):39–50, Jan. 1992.

Sethian, Level Set Methods, p. i–xviii, 1–95, 169–183 (Ch. 1–9, 16), *Cambridge Monographs on Applied and Computational Mathematics*, v. 3, ed. Ciarlet et al.,Cambridge University Press, 1996.

Sethian, Level Set Methods and Fast Marching Methods, p. vii–x, 77–100, 284–312 (Ch. 7–8, 20), *Cambridge Monographs on Applied and Computational Mathematics*, v. 3, ed. Ciarlet et al.,Cambridge University Press, 1999.

Van Trier et al., "Upwind Finite–Difference Calculation of Traveltimes," *Geophysics* 56(6):812–821, Jun. 1991.

Vidale, "Finite–Difference Calculation of Traveltimes in Three Dimensions," *Geophysics* 55(5):521–526, May 1990.

Vinje et al., "Traveltime and Amplitude Estimation using Wavefront Construction," *Geophysics* 58(8):1157–1166, Aug. 1993.

Wang et al., "Traveltime Calculation in 3D Media with Arbitrary Velocity Distribution," p. 1263–1266, Society of Exploration Geophysicists (SEG) International Exposition and 69$^{th}$ Annual Meeting, Oct. 31–Nov. 5, 1999, Houston.

Watanabe et al., "Seismic Traveltime Tomography using Fresnel Volume Approach," p. 1402–1405, Society of Exploration Geophysicists (SEG) International Exposition and 69$^{th}$ Annual Meeting, Oct. 31–Nov. 5, 1999, Houston.

Yilmaz et al., "Ray Tracing using Huygens' Principle," Technical Program, p. 1794–1797, Society of Exploration Geophysicists (SEG) International Exposition and 66$^{th}$ Annual Meeting, Nov. 10–15, 1996, Denver.

Zhou et al., "First Arrival Calculation in 3–D Media using Finite Difference Method," p. 1406–1409, Society of Exploration Geophysicists (SEG) International Exposition and 69$^{th}$ Annual Meeting, Oct. 31–Nov. 5, 1999, Houston.

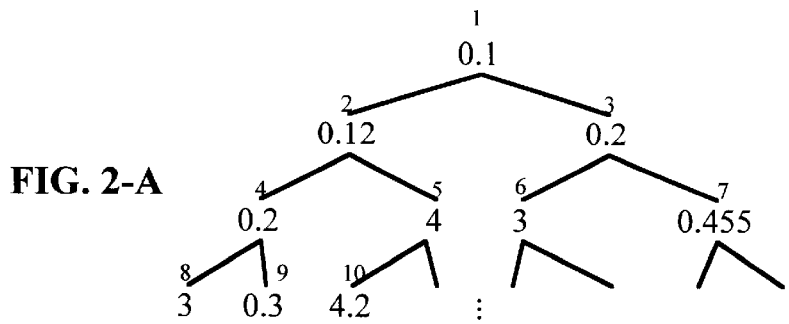
FIG. 2-A
FIG. 2-B
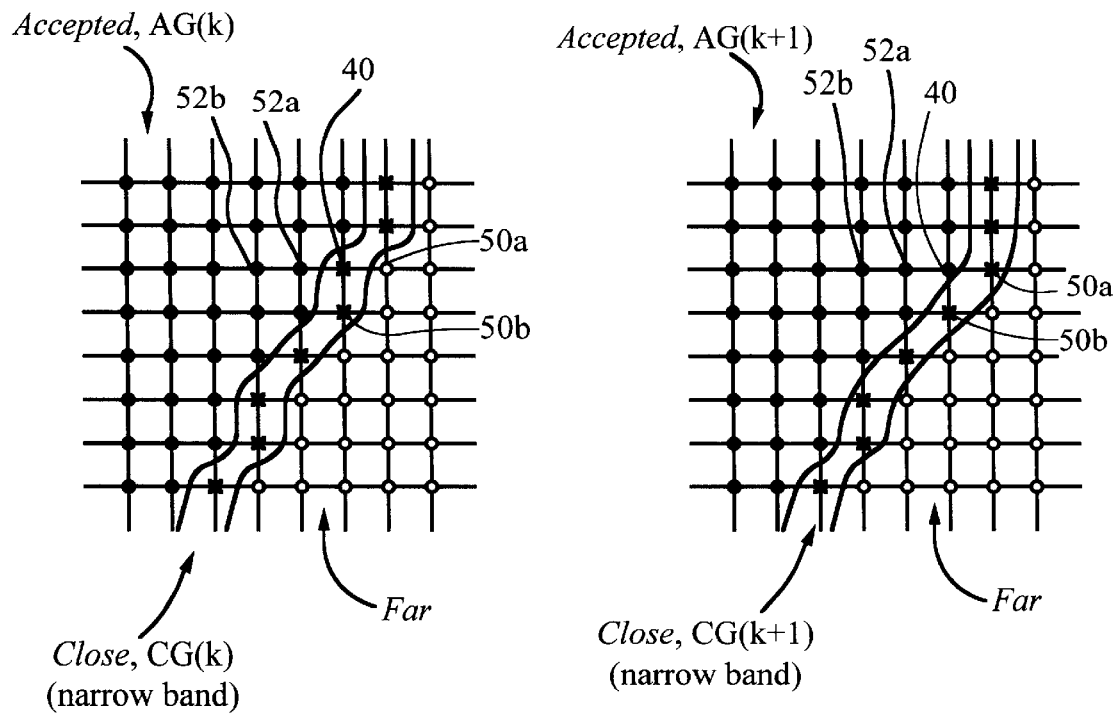
FIG. 3-A      FIG. 3-B

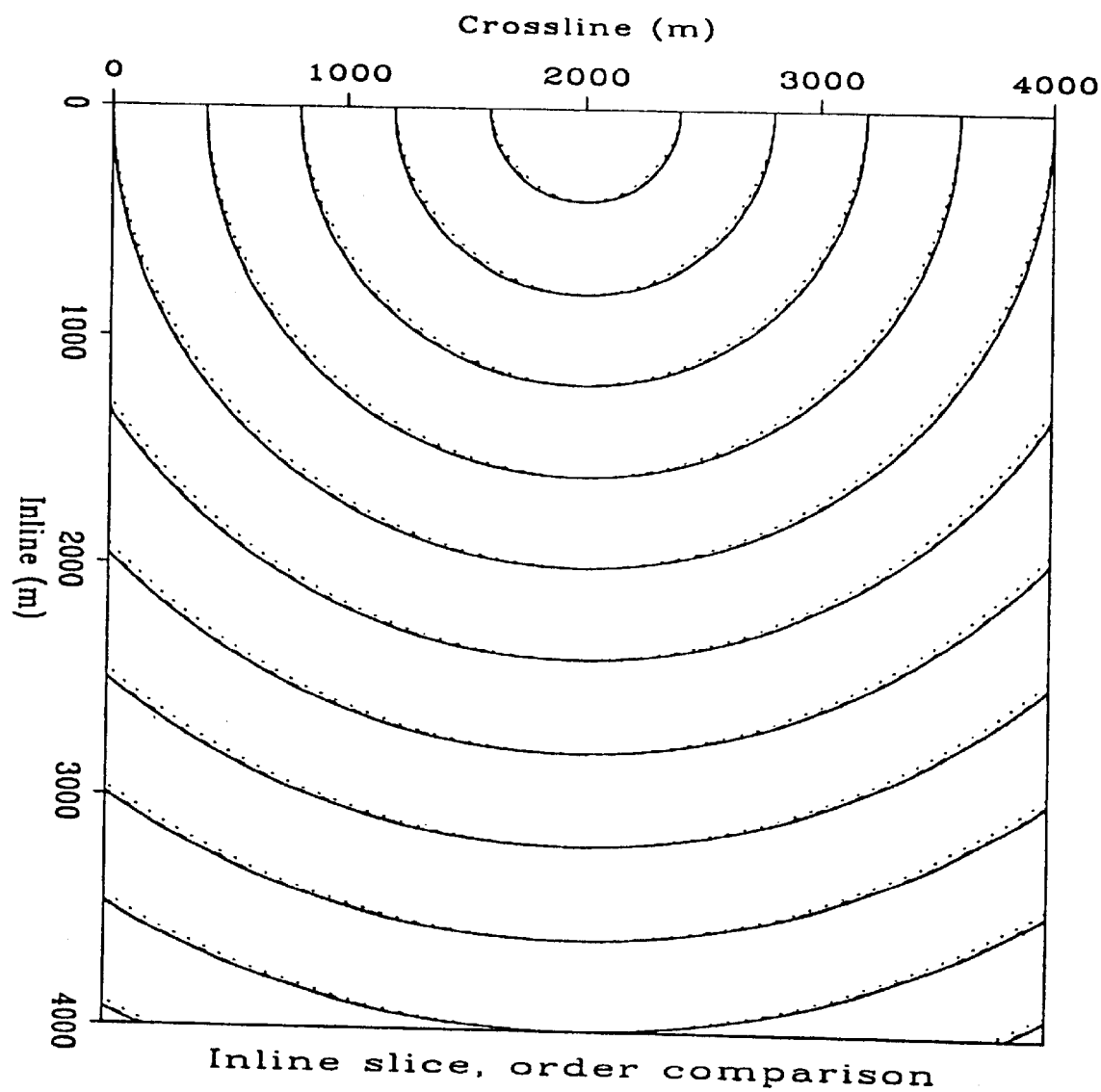
FIG. 5-A

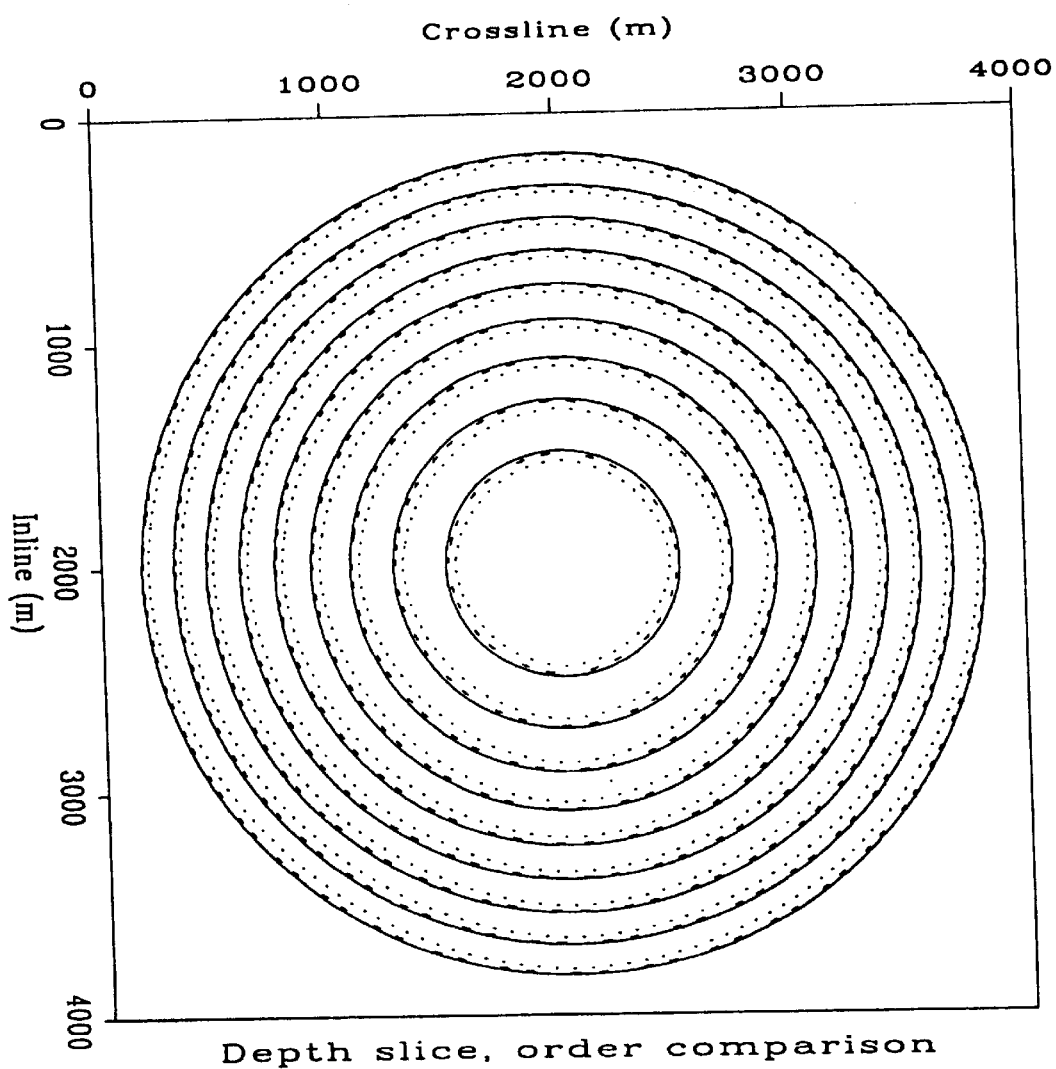
FIG. 5-B

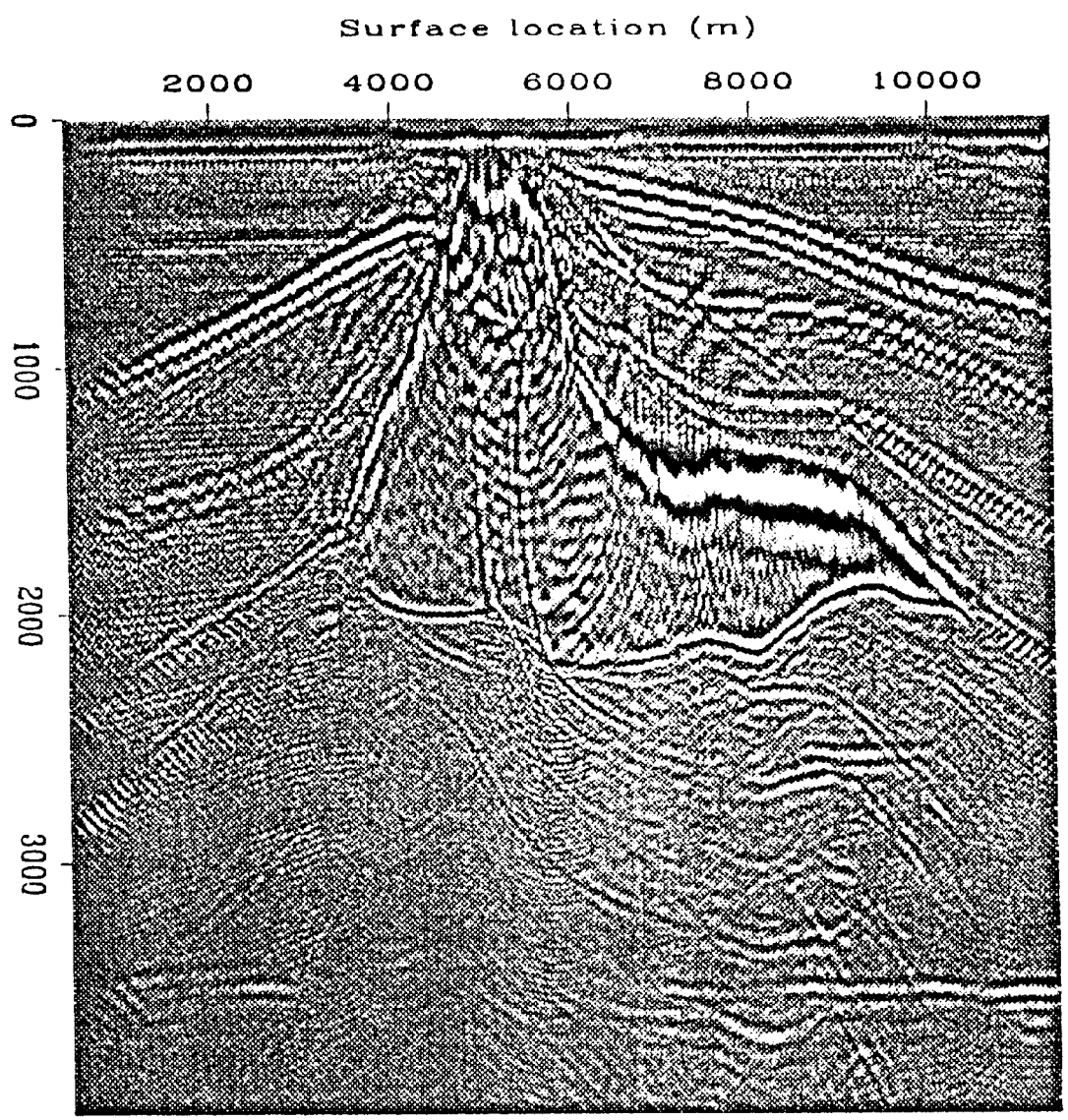
A. SEG Salt A1, first order
FIG. 7-A

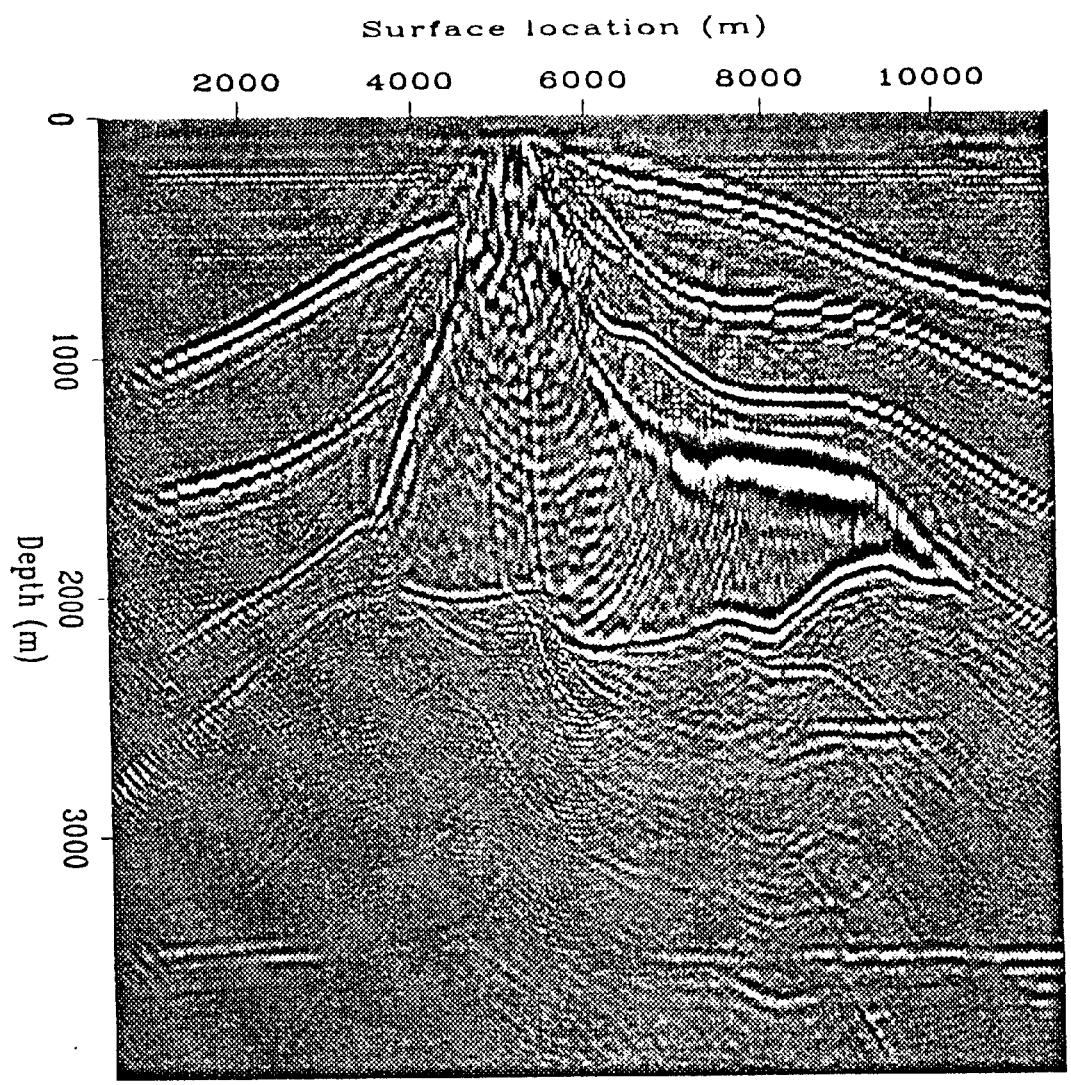
B. SEG Salt A1, second order
FIG. 7-B

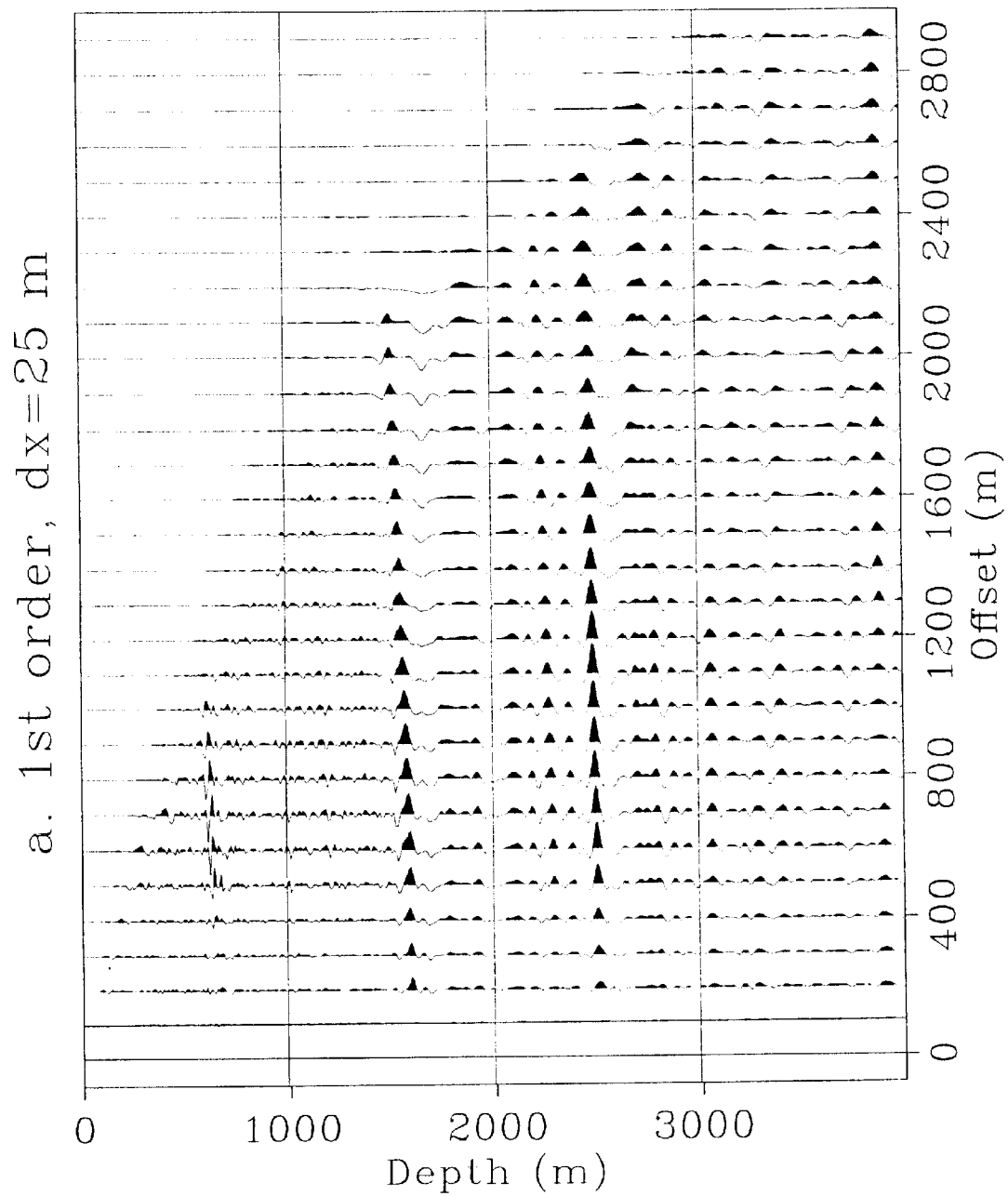
FIG. 8-A

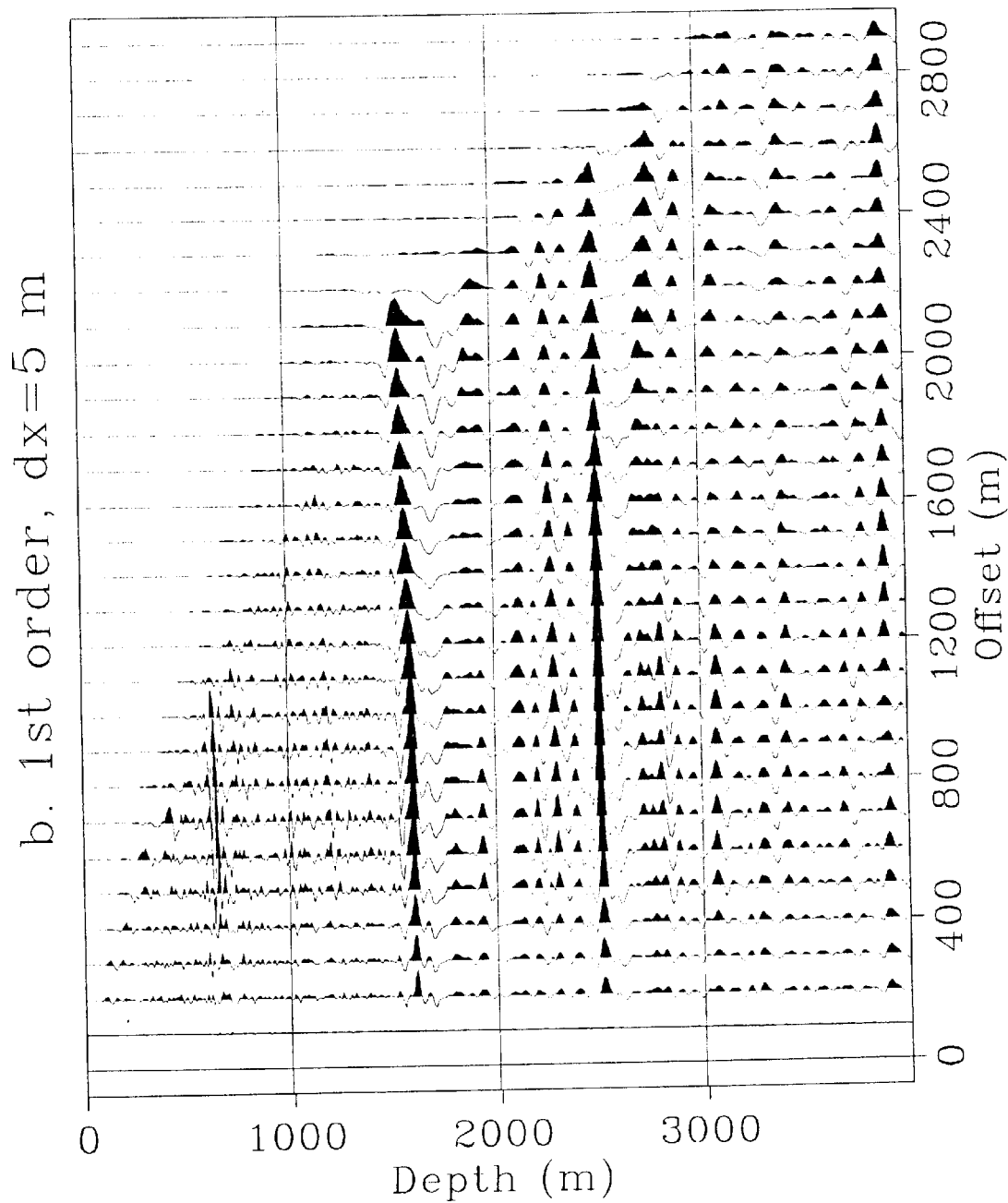
FIG. 8-B

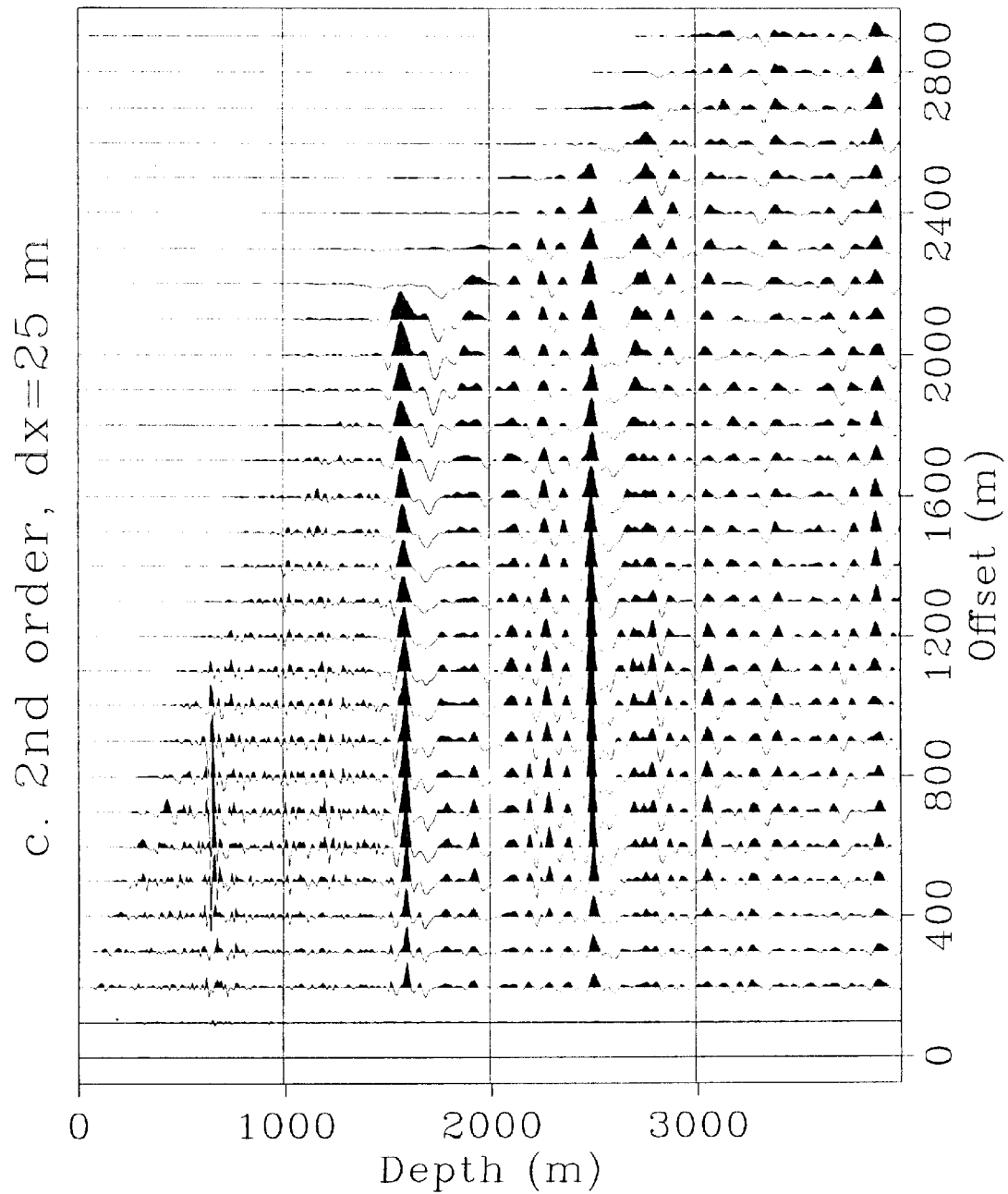
FIG. 8-C

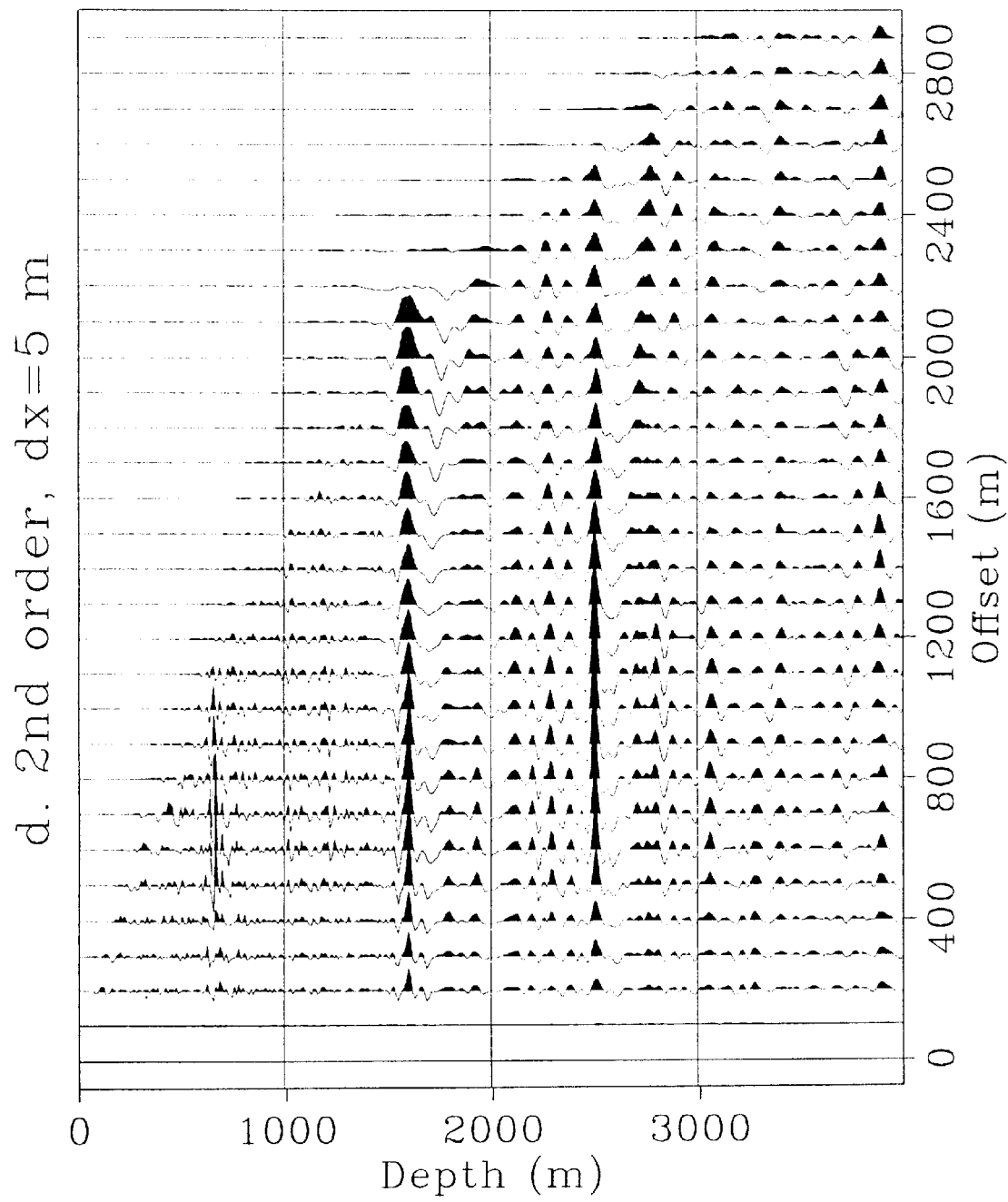
FIG. 8-D

SECOND-AND HIGHER-ORDER TRAVELTIMES FOR SEISMIC IMAGING

RELATED APPLICATION DATA

This application is based on U.S. Provisional Patent Application No. 60/133,311, filed May 10, 1999, which is herein incorporated by reference. This application is related to co-pending U.S. patent application Ser. No. 08/850,972, filed May 05, 1997, now U.S. Pat. No. 6,081,482.

BACKGROUND

This invention relates to geophysical prospecting using seismic signals, and in particular to methods of calculating traveltimes for geophysical data processing.

Effectively searching for oil and gas reservoirs often requires imaging the reservoirs using three-dimensional (3-D) seismic data. Seismic data is recorded at the earth's surface or in wells, and an accurate model of the underlying geologic structure is constructed by processing the data. Imaging 3-D seismic data is perhaps the most computationally intensive task facing the oil and gas industry today. The size of typical 3-D seismic surveys can be in the range of hundreds of gigabytes to tens of terabytes of data. Processing such large amounts of data often poses serious computational challenges.

Obtaining high-quality earth images necessary for contemporary reservoir development and exploration is particularly difficult in areas with complex geologic structures. In such regions, conventional seismic technology may either incorrectly reconstruct the position of geological features or create no usable image at all. Moreover, as old oil fields are depleted, the search for hydrocarbons has moved to smaller reservoirs and increasingly hostile environments, where drilling is more expensive. Advanced imaging techniques capable of providing improved knowledge of the subsurface detail in areas with complex geologic structures are becoming increasingly important.

Many imaging techniques, such as techniques based on Kirchhoff migration, require computing traveltimes for the region of interest. Efficiently applying such imaging techniques to 3-D seismic information requires fast, robust, and accurate methods to compute traveltimes.

Commonly used traveltime computation techniques face a number of challenges. Ray tracing methods, while relatively accurate, often suffer from considerable complexity and inability to illuminate shadow zones. Finite-difference schemes are typically simpler computationally, but often suffer from stability and accuracy issues. In particular, currently available finite-difference schemes often fail to adequately handle complex propagation effects in fields where complex geology and associated velocity variations are present.

A fast, accurate and unconditionally stable 3-D traveltime computation method would be an important tool in the arsenal of the seismic imaging geophysicist. A robust traveltime computation technique could be useful in many seismic data processing methods, including migration, datuming, modeling, and data acquisition design. Such a technique would allow improved use of three-dimensional (3-D) seismic data to characterize and delineate reservoirs and to monitor enhanced oil recovery (EOR) processes. A fast and robust traveltime computation method would be particularly useful for characterizing extremely complicated geological conditions such as those that exist below layers of salt in the Gulf of Mexico and in the overthrust regions of the Western United States. Better seismic images of complex subsurface geology can reduce development costs, as well as increase the amount of hydrocarbons recovered and the amount of national oil reserves.

In U.S. Pat. No. 6,018,499, Sethian et al. describe seismic data processing methods which include computing traveltimes by advancing a traveltime front selectively at the minimum-traveltime gridpoint along the front. The traveltimes along the front are stored as a heap, and are thus easily sorted. The Sethian et al. patent focuses on a first-order traveltime computation operator. Such a first-order operator is computationally efficient, but its local accuracy can depend on the local orientation of the traveltime front relative to the grid direction.

SUMMARY

The present invention provides a method of accurately and efficiently processing seismic signals for seismic exploration volumes or regions having complex geological structures. The method uses a high-order (second- or higher-order) traveltime computation operator when enough upwind traveltimes are available, and a first-order traveltime computation operator otherwise. For typical data sets, the method computes the vast majority of traveltimes using a high-order operator, and reverts to first-order for a limited number of exceptional points, typically around discontinuities and sharp velocity variations. Attempting to use a high-order operator in such exceptional regions can be computationally challenging. Selectively reverting to a first-order operator only in the presence of discontinuities or sharp velocity variations provides increased accuracy at most points without adding inordinate computational complexity.

In the preferred embodiment, the traveltime computation method includes providing a set of accepted traveltimes for an accepted grid region in the volume, providing a set of tentative traveltimes for a set of trial grid points arranged in a narrow band around the accepted grid region, and arranging the set of tentative traveltimes on a heap. The minimum traveltime in the heap is selected and added to the set of accepted traveltimes. The grid point corresponding to the minimum traveltime (the minimum-traveltime gridpoint) is implicitly added to the accepted grid region. The neighbors of the minimum-traveltime grid point which are not in the accepted grid region are added to the set of trial grid points. Tentative traveltimes for the non-accepted neighbors are computed/recomputed and put on the heap. The process continues by point-wise addition of the minimum traveltime in the heap at each position of the traveltime front, to advance the front until accepted traveltimes are computed for the entire grid region of interest.

The tentative traveltimes are preferably computed using a high-order (second- or higher-order) or first-order approximation to the eikonal equation. The traveltime computation includes solving the eikonal equation in all the points of a 3-D grid. For the grid points for which enough accepted neighboring traveltimes are available, a high-order approximation is employed. For the points for which enough neighboring accepted traveltimes are not available, a first-order method is used.

DESCRIPTION OF THE FIGURES

FIG. 2-A shows a binary tree representation of part of an arbitrary binary heap, including the top of the heap, according to the present invention.

FIG. 2-B shows an array representation of the heap of FIG. 2-A.

FIGS. 3-A and 3-B illustrate the computation of a tentative traveltime using a second- or higher-order computation method, according to the present invention.

FIGS. 5-A and 5-B illustrate inline and depth slices, respectively, showing traveltime fronts calculated using an exact solution, a first-order scheme, and a second-order scheme in a constant velocity model, according to the present invention.

FIGS. 7-A and 7-B show inline slices through the SEG-EAGE salt dome generated using a first-order and a second-order traveltime computation algorithm, respectively, according to the present invention.

FIGS. 8-A through 8-B shows a comparison of four migrated common reflector point gathers in a real North Sea 3-D dataset for a first-order traveltime computation scheme (FIGS. 8-A and 8-B) and a second-order scheme (FIGS. 8-C and 8-D), according to the present invention.

DETAILED DESCRIPTION

In the following discussion, a high-order operator is understood to be an operator of second order or higher. The following description illustrates the present invention by way of example and not necessarily by way of limitation.

A set of seismic signals for a seismic exploration volume or region of interest is first provided by well known methods. The seismic signals may be real data recorded on the earth's surface or within wells using geophones or hydrophones. The seismic signals may also be synthetic data corresponding to the earth's surface, to some underground surface or other locations. Synthetic data may be generated from real data, other synthetic data, velocity data, and/or petrophysical rock data. Methods suitable for generating synthetic data include modeling, migration, and datuming methods. Examples of such methods include Kirchhoff modeling, finite-difference modeling, phase-shift modeling, Kirchhoff migration, finite-difference migration, phase-shift migration, migration to zero offset (MZO), and controlled illumination migration, among others.

A velocity model for the volume is then provided by well-known methods. The velocity model is a 3-D array describing the distribution of velocities on a grid within the volume of interest. For simplicity, the term velocity will be used to refer to both speeds and slownesses within the model. The grid is preferably a Cartesian (x-y-z) grid, although spherical, tetragonal, hexagonal or other grids may also be used. Determining a suitable velocity model for a given volume is well known in the art and will not be discussed here in detail.

Figure 1:
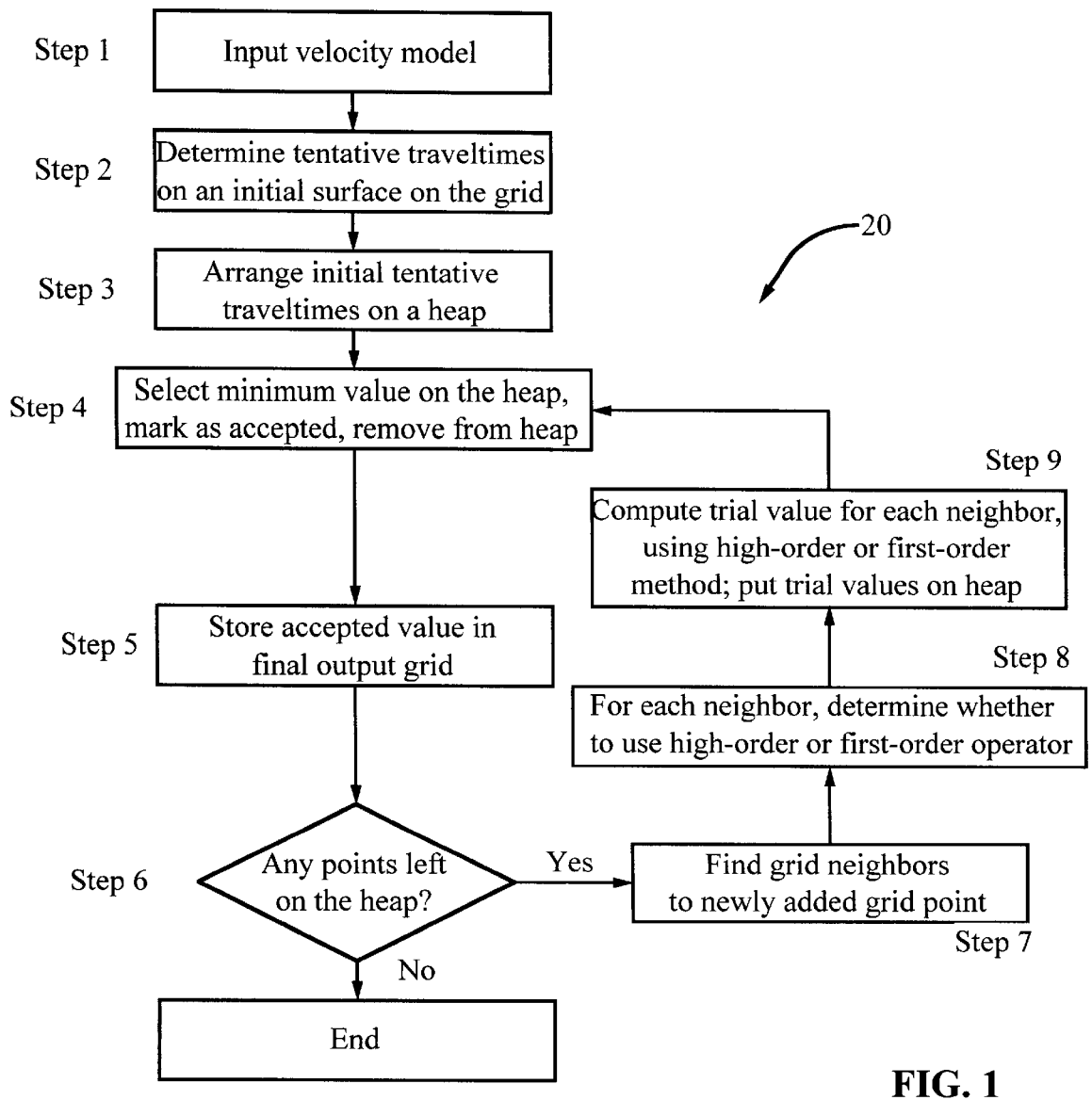
FIG. 1 is a flow chart outlining a preferred traveltime computation method of the present invention.

A set of traveltimes characterizing the propagation of the seismic signals within the volume is then generated as outlined below. FIG. 1 outlines the processing steps in a preferred traveltime computation method of the present invention. The velocity model is provided to a computer system of the present invention (step 1). A set of initial (primary) tentative seismic traveltimes on an initial surface within the volume is then generated (step 2). The set of initial traveltimes is a data array stored in the system memory or in some other storage device. The initial surface is generally the surface over which the seismic signals are recorded or simulated, but may also be any arbitrary surface within the velocity model. In general, the initial traveltimes lie in a narrow band situated adjacent to some accepted grid region for which traveltimes are known.

For seismic signals recorded using point sources at the earth surface, the initial surface is preferably defined by the grid points immediately adjacent to a point source. Such a point source could be used to define a zero traveltime. For seismic signals generated by simulating a plane-wave source at the earth surface, the initial surface can be a planar surface defined by grid points adjacent to the earth surface.

Figure 4:
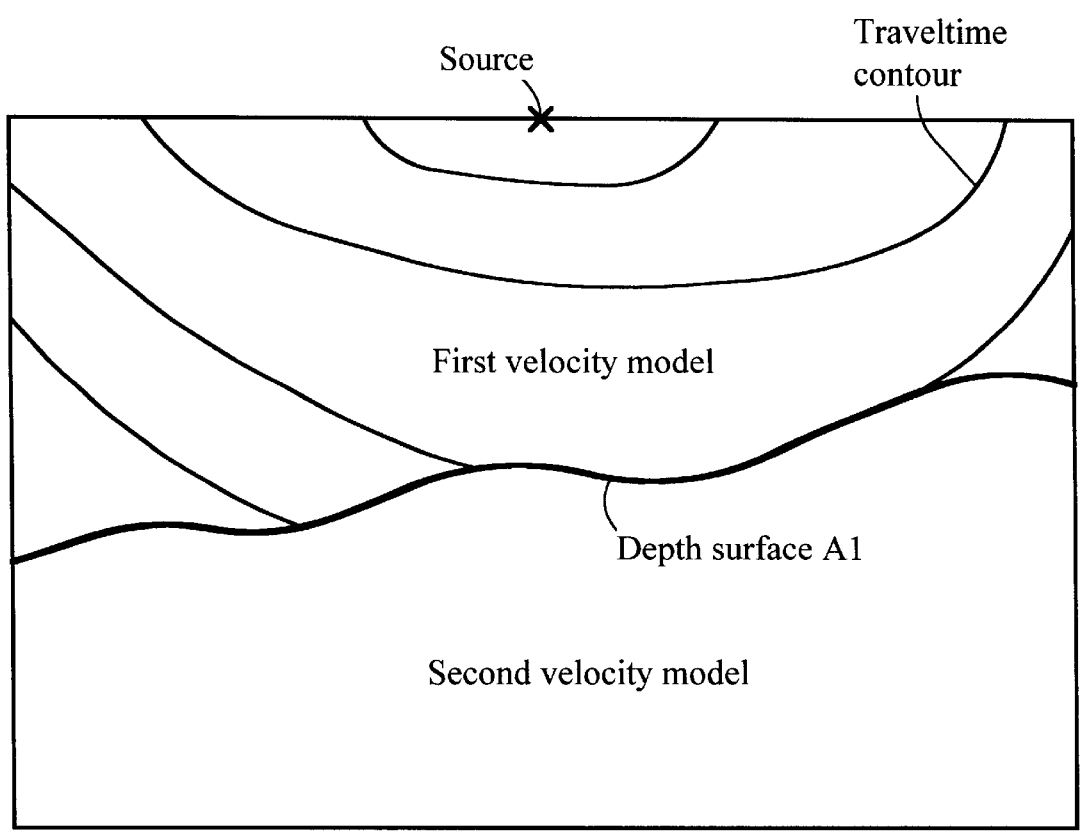
FIG. 4 illustrates an intermediate depth surface suitable for resetting the initial conditions for traveltime computation, according to an embodiment of the present invention.

The initial surface may also be any underground surface, for example a non-planar surface defining a velocity interface. FIG. 4 shows an intermediate underground depth surface A1 separating two subvolumes characterized by distinct velocity models. FIG. 4 also shows several traveltime contours within the upper subvolume. An underground initial surface such as surface A1 can be useful in a layer-stripping method in which traveltimes are first computed from the earth surface to the underground surface, and then from the underground surface onward. For information on layer-stripping and downward continuation see the above-referenced co-pending patent application No. 08/850,972.

Referring to FIG. 1, the initial tentative traveltimes are arranged on a heap (step 3). For information on heaps and heap sorting see for example Cormen, *Introduction to Algorithms*, MIT Press, Cambridge, Mass., 1990, Chapter 7 (pp. 140–152). Briefly, a heap can be viewed as a tree or a corresponding ordered array. FIGS. 2-A and 2-B schematically illustrate a sample binary heap represented as a tree and as an array, respectively. The value stored at each heap position is shown underneath the index of the position. The values in the heap are shown for illustrative purposes only, and do not represent actual tentative seismic traveltimes. A binary heap has the property that the value at any given "child" position (i) is always larger than or equal to the value at its "parent" position (int(i/2)).

The minimum traveltime in the heap is stored at the top of the heap. Arranging the tentative traveltime array on a heap effectively identifies and selects the minimum traveltime in the array. The minimum traveltime on the heap identifies a corresponding minimum-traveltime grid point. Values can be added to or removed from the heap. Adding or removing a value to/from the heap includes re-arranging the array so as to satisfy the heap condition ("heapifying" the array). "Heapifying" an array can be achieved by recursively exchanging the positions of any "parent"—"child" pair violating the heap property until the heap property is satisfied across the heap. Adding or removing a value from a heap generally has a computational cost of order O(logN), where N is the number of heap elements.

Referring again to FIG. 1, the minimum traveltime in the heap (the traveltime at the top of the heap) is removed from the heap (step 4), and saved as an accepted traveltime in the final traveltime output grid (step 5). The narrow band array resulting after the removal of the minimum traveltime is then re-ordered as a heap ("heapified").

In step 6, it is checked whether there are any traveltimes left on the heap. If no traveltimes are left on the heap, the method is ended. The output grid then contains accepted traveltimes for all grid points in the volume of interest. If the heap contains at least some traveltimes, the method continues on to step 7.

In step 7, the non-accepted neighbors to the accepted grid points are determined. The non-accepted neighbors include neighbors in the narrow band and neighbors outside of the narrow band. The non-accepted neighbors have now become target grid points for which traveltimes are to be computed. For each non-accepted neighbor, it is first determined whether to use a high-order or a first-order traveltime computation operator (step 8), as illustrated in detail below. Then, for each non-accepted neighbor, a tentative traveltimes is computed/recomputed as described below, and the tentative traveltime is inserted in the narrow band array (steps 8–9). The narrow band array is then again heapified. Steps 4–9 are then repeated for the updated heap until there are no points left on the tentative traveltime heap. Steps 4–9 form a loop 20.

FIGS. 3-A and 3-B show sample grid points to which the steps illustrated in FIG. 1 are applied. As illustrated in FIG. 3-A, a Close narrow band CG(k) is adjacent to an Accepted grid region AG(k). Further away from the accepted points are Far points for which traveltimes have not yet been computed. A minimum-traveltime point 40 is added to AG(k) to generate AG(k+1), as shown in FIG. 3-B. Point 40 corresponds to the minimum traveltime in CG(k). Point 40 is removed from CG(k), and a Far neighbor 50a is added to CG(k) to generate CG(k+1). A tentative traveltime ($u_t$) for point 50a is then computed as described below and added to the narrow band array. The tentative traveltime for a point 50b, which remains in the narrow band after the addition of point 40, is preferably recomputed using the accepted traveltime for point 40. The traveltime for point 50b is then updated in the narrow band array, and the narrow band array is re-arranged as a heap if necessary.

The tentative traveltimes for the target grid points are preferably computed from accepted values and velocity model data using a finite-difference approximation to the eikonal equation. The eikonal equation can be represented as $$|\nabla u(x, y, z)| = s(x, y, z), \quad [1]$$

where u(x,y,z) is the traveltime field and s(x,y,z) is the slowness function, defined as the inverse of the speed.

The following discussion will focus on derivatives along the x-axis. Derivatives along the y- and z-axes are understood to be similar to the x-derivatives expressions below. A second-order backward approximation to the first derivative $U_x$ is given by $$u_x \approx \frac{3u_i - 4u_{i-1} + u_{i-2}}{2\Delta x}, \quad [2]$$

where $u_i$, $u_{i-1}$, and $u_{i-2}$ are the traveltimes for three adjacent gridpoints along the x-axis. Eq. [2] can be derived from the terms up to second-order in the Taylor expansion of u.

Define the backward and forward operators $D^{-x}$, $D^{+x}$, $D^{-x-x}$, $D^{+x+x}$ $$D^{-x}u = \frac{u(x) - u(x-h)}{h}, \quad D^{+x}u = \frac{u(x+h) - u(x)}{h}, \quad [3a]$$

where h is the sampling distance in the x direction. The operators $D^{-y}$, $D^{+y}$, $D^{-z}$ and $D^{+z}$ are defined in a similar manner, using the appropriate grid sampling.

Using the notation of eqs. [3a–b], eq. [2] may be compactly written as $$u_x \approx D^{-x}u + \frac{\Delta x}{2} D^{-x-x}u. \quad [4a]$$

The forward second-order approximation to the first derivative $u_x$ has the similar form $$u_x \approx D^{+x}u - \frac{\Delta x}{2} D^{+x+x}u. \quad [4b]$$

Consider now the switch functions $$\text{switch}_{ijk}^{-x} = \begin{bmatrix} 1 & \text{if } u_{i-2,j,k} \text{ and } u_{i-1,j,k} \text{ are known and } u_{i-2,j,k} \leq u_{i-1,j,k} \\ 0 & \text{if not} \end{bmatrix}, \quad [5a]$$

$$\text{switch}_{ijk}^{+x} = \begin{bmatrix} 1 & \text{if } u_{i+2,j,k} \text{ and } u_{i+1,j,k} \text{ are known and } u_{i+2,j,k} \leq u_{i+1,j,k} \\ 0 & \text{if not} \end{bmatrix}, \quad [5b]$$

with similar expressions for the y- and z-axes. The switch functions are flags for the suitability of using a second-order operator at a particular grid point. For example, if $\text{switch}_{ijk}^{-x}$ is 1 then both traveltimes $u_{(i-1)jk}$ and $u_{(i-2)jk}$ are suitable for determining a traveltime for the point $u_{ijk}$, as explained below. If $\text{switch}_{ijk}^{-x}$ is 0 then the traveltime $u_{(i-2)jk}$ is not used in the determination of $u_{ijk}$; for such points the preferred computation method reverts to first-order.

Computing the switch functions of eqs. [5a–b] is the preferred way of determining whether enough traveltimes are available for a second-order traveltime computation operator (step 8 in FIG. 1). As is apparent to the skilled artisan, other switch functions than the ones shown above may be used in a method of the present invention. Such switch functions may have more than two alternative values, and may take on analog values within a range. Generally, such switch functions will depend on traveltimes that are n grid spacings away from the target grid point, where n is the order of the traveltime computation operator.

The tentative traveltimes are preferably determined according to the relation $$\begin{bmatrix} \max\left[\left(D_{ijk}^{-x}u + \text{switch}_{ijk}^{-x}\frac{\Delta x}{2}D_{ijk}^{-x-x}u\right), -\left(D_{ijk}^{+x}u - \text{switch}_{ijk}^{+x}\frac{\Delta x}{2}D_{ijk}^{+x+x}u\right), 0\right]^2 \\ +\max\left[\left(D_{ijk}^{-y}u + \text{switch}_{ijk}^{-y}\frac{\Delta y}{2}D_{ijk}^{-y-y}u\right), -\left(D_{ijk}^{+y}u - \text{switch}_{ijk}^{+y}\frac{\Delta y}{2}D_{ijk}^{+y+y}u\right), 0\right]^2 \\ +\max\left[\left(D_{ijk}^{-z}u + \text{switch}_{ijk}^{-z}\frac{\Delta z}{2}D_{ijk}^{-z-z}u\right), -\left(D_{ijk}^{+z}u - \text{switch}_{ijk}^{+z}\frac{\Delta z}{2}D_{ijk}^{+z+z}u\right), 0\right]^2 \end{bmatrix}^{1/2} = s_{ijk}, \quad [6]$$

For each point (x,y,z,) in the grid, eq. [6] is used to compute a value of u(x,y,z) from a corresponding value of s(x,y,z), the local grid spacing, and accepted traveltimes for neighboring gridpoints. The scheme attempts to use a second-order one-sided upwind stencil whenever suitable points are available, but reverts to a first-order scheme in the other cases. That is, the operator becomes second-order when there are enough suitable accepted valued behind the stencil. As the number of grid points increases, this technique approaches asymptotically a full second order solution.

Eq. [6] can be thought to define a conditional second-order traveltime computation operator: the operator is second order for those points for which enough suitable neighboring accepted traveltimes are available, and is first-order otherwise. Equivalently, eq. [6] can be thought to define first- and second-order traveltime computation operators. The operator(s) is/are typically first order around singularities or discontinuities, or in regions exhibiting high velocity variations.

Referring to FIGS. 3-A and 3-B, in a second-order method, the traveltime $u_i$ for point 50a depends on the traveltime values for points 40 ($u_{i-1}$) and 52a ($u_{i-2}$), if the appropriate switch function for point 50a is 1. If the switch function for point 50a is 0, the traveltime for point 50a does not depend on the traveltime for point 52a.

In a third-order method, the traveltime $u_i$ for point 50a may depend on the traveltime values for points 40 ($u_{i-1}$), 52a ($u_{i-2}$), and 52b ($u_{i-3}$). Points 52a and 52b are two and three gridspacings away from point 50a, respectively. Using the reasoning presented above, the switch functions of eqs. [5a] and [5] can then be set to 1 only if the appropriate neighboring traveltimes are known and are all sequentially larger toward $u_i$. Generally, the switch functions characterize the availability of suitable upwind traveltimes for a high-order traveltime determination process.

As the skilled artisan will appreciate, the method described above can be readily generalized for an operator of order n>3. Using the technique outline above, the skilled artisan can readily determine relations corresponding to those of eqs. [2–4] for higher--order operators from the corresponding terms in the Taylor expansions of u.

Accepted traveltimes computed using the preferred method described above accurately characterize the propagation of seismic signals in volumes having complex velocity structures. The seismic signals are processed using the accepted traveltimes. The processing preferably comprises generating a 3-D image of the volume by pre-stack or post-stack Kirchhoff migration. Examples of other processing methods employing the accepted traveltimes include VSP migration, controlled illumination migration, velocity analysis, Kirchhoff modeling, Kirchhoff datuming, variable velocity migration to zero-offset, tomography, controlled stack, and data acquisition design.

The preferred traveltime computation method described above can be better understood by considering the observation that, at its core, the problem of computing first arrival traveltimes is equivalent to tracking an interface advancing with a speed normal to itself. An important goal in such an interface advancement is to accurately and robustly deal with the formation of cusps and corners, topological changes in the propagating interface, and stability issues in three space dimensions.

The preferred traveltime computation method addresses these issues by advancing the traveltime front in an upwind fashion selectively at the interface point having the minimum traveltime. The traveltime computation rests on the assumption that information propagates "one way", that is, from smaller values of u(x,y,z) to larger values. The present invention, in its preferred implementation, solves the eikonal equation by building the solution outwards selectively from the smallest u(x,y,z) value. The process of recomputing the u(x,y,z) values at upwind neighboring points cannot yield a value smaller than any of the accepted points. Thus, we can march the solution outwards, always selecting the narrow band grid point with minimum trial value for u(x,y,z), and readjusting neighbors, as shown in FIGS. 3-A and 3-B. Another way to look at the method is that each minimum trial value begins an application of Huygens' principle, and the expanding wave front touches and updates other trial values.

The method correctly deals with the development of corners and cusps in the evolving solution, allowing the method to accurately characterize the propagation of signals through complex velocity structures. The finite-difference approximation to the eikonal equation is resolved to machine precision in each point of the grid, making the accuracy of the method dependent only on the grid size and the order of the finite-difference scheme used.

The preferred traveltime computation method is made fast by confining the "building zone" to a narrow band around the front, and further by arranging the narrow band traveltimes on a heap. Arranging the narrow band traveltimes on a heap allows a reduction in the computational cost of rearranging the tentative traveltimes when elements are added and/or removed from the tentative traveltime set. The cost of a heap operation is $\log(N_{NB})$, where $N_{NB}$ is the total number of traveltimes in the narrow band. The total number of operations needed to solve the eikonal equation on the 3-D cartesian grid is then $O(N\log(N_{NB}))$, where N is the total number of gridpoints. The logarithmic dependence of the computational cost on the total number of traveltimes is the key to the remarkable speed of the preferred method of the present invention.

While a pure first-order method can be relatively efficient, on a Cartesian grid the computed solution along diagonals lags behind those along grid lines. For example, in computing the solution to the simple eikonal with a uniform velocity of 1, which yields the distance from the source to any point, the computed first-order solution has no error along any grid line that intersects the source, and varies most profoundly along the diagonal. This effect is evident over large physical domains, and manifests itself on non-cartesian grids as well. A second- or higher-order method allows significantly reducing traveltime computation errors.

At the same time, a pure second- or higher-order method can become difficult to implement and computationally inefficient around discontinuities or singularities such as corners or cusps, or generally in regions with sharp velocity variations. Reverting to first-order around singularities maintains computational efficiency without unacceptable loss of accuracy. Allowing the method to revert to first order can result in an increase in computational efficiency by one or two orders of magnitude, as compared to an otherwise-identical pure-second-order method. At the same time, for typical data sets, almost all traveltimes are computed to second-order accuracy. The preferred method is essentially second-order except for a small fraction of the total number of gridpoints. As the number of grid points increases, second-order convergence is obtained in both the $L_2$ and $L_\infty$ norms.

The method described above also can be extended to more general static Hamiltonians of the form $$H(Du,x)=0 \qquad [7]$$

where Du represents the derivatives in each of the component variables $U_{x1}, \ldots, U_{xN}$. If there are N total points in the grid, then the scheme solves the equation in O(NlogN) steps. For further information on eq. [7] see Sethian, *Level Set Methods*, Cambridge University Press, 1996.

The present invention further provides a traveltime computation system including means for performing the above-referenced steps. The system preferably includes one or more general-purpose computers running suitable software.

The following example is intended to illustrate the invention, and should not be construed to limit the invention.

EXAMPLES

Figure 6:
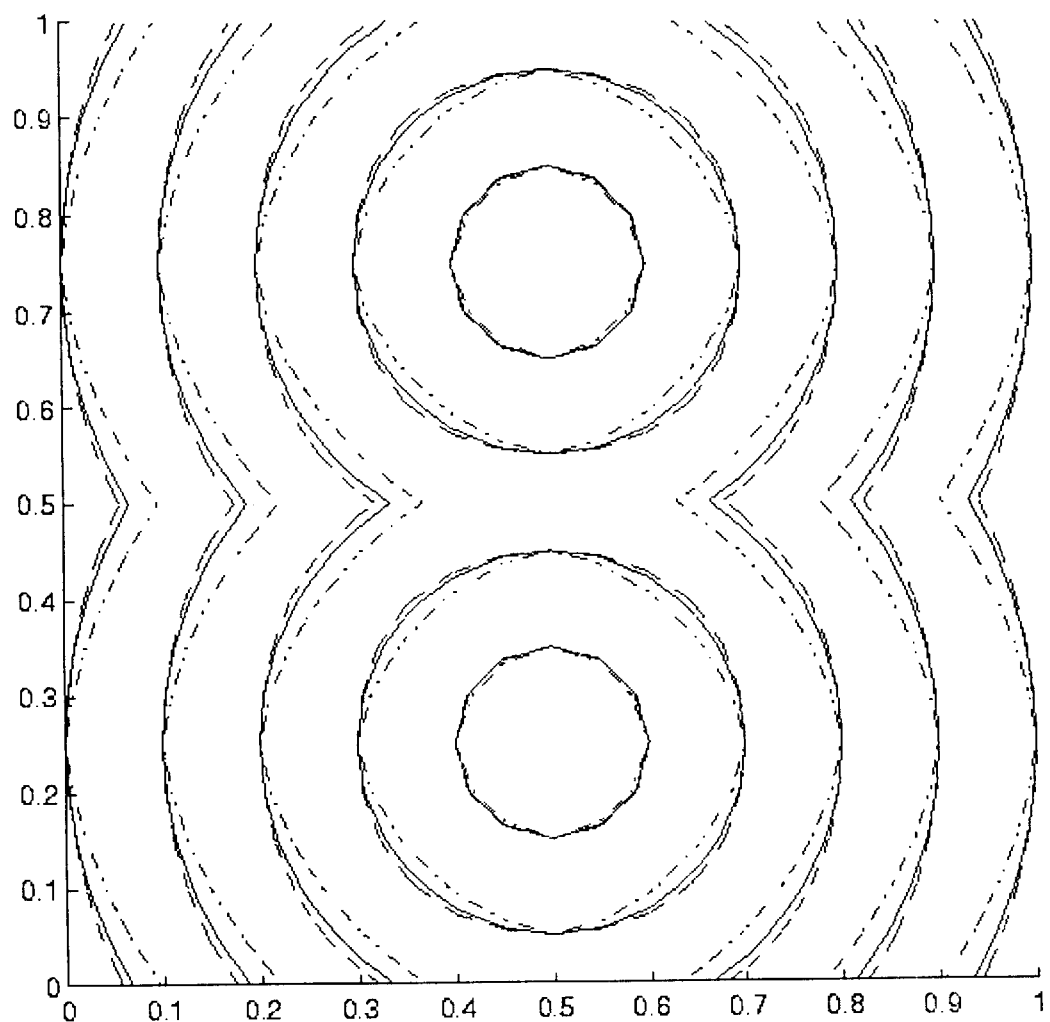
FIG. 6 illustrates traveltime computations using an exact solution, a first-order scheme, and a second-order scheme for two sources at (0.25, 0.5) and (0.75, 0.5) on a rough 21×21 grid, according to the present invention.

A high-order traveltime computation method of the present invention was compared to a first-order traveltime computation method as described in the above-referenced U.S. Pat. No. 6,018,499. FIGS. 5-A and 5-B illustrate inline and depth slices, respectively, showing traveltime fronts calculated using an exact solution, a first-order scheme, and a second-order scheme in a constant-velocity 200×200×200 grid. The analytic solution is represented as a solid line, the first-order solution as short dashes, and the second-order solution as long dashes. FIG. 6 illustrates traveltime computations using an exact solution, a first-order scheme, and a second-order scheme for two sources at (0.25, 0.5) and (0.75, 0.5) on a 21×21 grid. The analytic solution is represented as a solid line, the first-order solution as short dashes, and the second-order solution as long dashes. As illustrated, the second-order method provides a more accurate solution than the first-order method.

We evaluated the preferred conditional second-order traveltime computation method and a similar first-order method on the 3-D SEG/EAGE salt dome velocity model described by Aminzadeh et al. ("3-D Modeling Project: Third Report," *The Leading Edge* 14:125–128 (1995)). The salt dome model was designed to contain major complex features that are characteristic to complicated Gulf of Mexico salt structures. It includes a northwesterly plunging stock, a secondary reactivation crest southward of the stock, a low-relief eastern flank, a faulted southern flank with a toe thrust, a rounded overhang on the west flank, five sands that are gas charged (at least one contains both a gas/oil and an oil/water contact), and a shale sheath that is modeled to be geopressured. The sea floor map exhibits a counter-regional fault scarp, a bathymetric rise associated with the sill crest, and a shelf break at the southeast end of the model. The overall model size is 13.5×13.5×4.2 km on a 20 m grid.

FIGS. 7-A and 7-B show migration lines through the SEG-EAGE salt dome A1 dataset generated using a first-order and a conditional second-order traveltime computation algorithm, respectively. Notice the improved resolution in FIG. 7-B of the sediment reflections and the overall reduction in migration artifacts.

FIGS. 8-A through 8-D show a comparison of migrated common reflector point (CRP) gathers in a real North Sea 3-D dataset, using different grid sampling for building the 3-D traveltime tables. The traveltime tables have a grid sampling of 25 m and 5 m. FIGS. 8-A and 8-D represent migration results using first order traveltimes, while FIGS. 8-C and 8-D represent migration results using second order traveltimes. The grid sampling is 25 m for the first and third panels, and 5 m for the second and fourth panels. For the first order, even after reducing the grid sampling to 5 m, which is impractical for many realistic situations, the error affects the velocity analysis performed on the CRPs. In the second order case, the improvement resulting from reducing the grid size is insignificant.

It will be clear to one skilled in the art that the above embodiments may be altered in many ways without departing from the scope of the invention. For example, one need not store actual traveltime values, but may store and/or sort data which can be used to reconstruct actual traveltime values, such as the inverse of traveltime values. Similarly, as is apparent to the skilled artisan, actual velocities or slownesses can be used as convenient. Operators higher than third-order may be used. The traveltime front can be advanced globally in a single step rather than selectively at the minimum-traveltime grid point. The traveltime computation operator need not necessarily employ a finite-difference solution to the eikonal equation. Other well-known equations/approximations may be used. The method may be used in any number of dimensions, including 2-D and 3-D. Tentative traveltimes need not be recomputed; tentative traveltimes can then be implicitly accepted traveltimes. Accordingly, the scope of the invention should be determined by the following claims and their legal equivalents.

What is claimed is:

1. A computer-implemented three-dimensional seismic data processing method comprising the steps of:

a) providing a set of seismic signals for a seismic exploration volume;

b) providing a velocity model for the volume;

c) generating a set of accepted traveltimes for the volume by
providing accepted traveltimes for an accepted grid region within the volume,
providing tentative traveltimes for a set of trial grid points arranged in a narrow band around the accepted grid region,
arranging the tentative traveltimes on a heap,
selecting a minimum traveltime from the heap as an accepted traveltime, thereby adding to the accepted grid region a minimum-traveltime grid point corresponding to the minimum traveltime,
adding a neighbor of the minimum-traveltime grid point which is not in the accepted grid region to the set of trial grid points,
determining whether enough accepted traveltimes are available for a high-order traveltime computation for the neighbor,
if enough accepted traveltimes are available, computing a tentative traveltime for the neighbor using a high-order traveltime computation operator,
if enough accepted traveltimes are not available, computing the tentative traveltime for the neighbor using a first-order traveltime computation operator,
putting the tentative traveltime for the neighbor on the heap, and
advancing the accepted grid region to generate the set of accepted traveltimes; and d) processing the seismic signals using the set of accepted traveltimes to characterize a propagation of the seismic signals through the volume.

2. The method of claim 1 wherein the high-order operator is a second order operator.

3. The method of claim 1 wherein the step of determining whether enough traveltimes are available for the high-order traveltime computation operator comprises computing the switch functions:

$$\text{switch}_{ijk}^{-x} = \begin{bmatrix} 1 & \text{if } u_{i-2,j,k} \text{ and } u_{i-1,j,k} \text{ are known and } u_{i-2,j,k} \le u_{i-1,j,k} \\ 0 & \text{if not} \end{bmatrix}$$

and $$\text{switch}_{ijk}^{+x} = \begin{bmatrix} 1 & \text{if } u_{i+2,j,k} \text{ and } u_{i+1,j,k} \text{ are known and } u_{i+2,j,k} \le u_{i+1,j,k} \\ 0 & \text{if not} \end{bmatrix},$$

wherein the indexes i, j, and k characterize the x, y, and z coordinates of the neighbor, respectively, and wherein u denotes traveltime.

4. The method of claim 3 wherein computing the accepted traveltime for the neighbor comprises employing the stencil $$\begin{bmatrix} \max\left[\left(D_{ijk}^{-x}u + \text{switch}_{ijk}^{-x}\frac{\Delta x}{2}D_{ijk}^{-x-x}u\right), -\left(D_{ijk}^{+x}u - \text{switch}_{ijk}^{+x}\frac{\Delta x}{2}D_{ijk}^{+x+x}u\right), 0\right]^2 \\ +\max\left[\left(D_{ijk}^{-y}u + \text{switch}_{ijk}^{-y}\frac{\Delta y}{2}D_{ijk}^{-y-y}u\right), -\left(D_{ijk}^{+y}u - \text{switch}_{ijk}^{+y}\frac{\Delta y}{2}D_{ijk}^{+y+y}u\right), 0\right]^2 \\ +\max\left[\left(D_{ijk}^{-z}u + \text{switch}_{ijk}^{-z}\frac{\Delta z}{2}D_{ijk}^{-z-z}u\right), -\left(D_{ijk}^{+z}u - \text{switch}_{ijk}^{+z}\frac{\Delta z}{2}D_{ijk}^{+z+z}u\right), 0\right]^2 \end{bmatrix}^{1/2} = s_{ijk},$$

wherein s denotes slowness.

5. The method of claim 1 wherein computing the traveltime for the neighbor comprises employing a finite-difference solution to the eikonal equation.

6. The method of claim 5 wherein the finite-difference solution comprises a second-order approximation to a gradient term of the eikonal equation.

7. The method of claim 6 wherein the second-order approximation is $$\begin{bmatrix} \max\left[\left(D_{ijk}^{-x}u + \text{switch}_{ijk}^{-x}\frac{\Delta x}{2}D_{ijk}^{-x-x}u\right), -\left(D_{ijk}^{+x}u - \text{switch}_{ijk}^{+x}\frac{\Delta x}{2}D_{ijk}^{+x+x}u\right), 0\right]^2 \\ +\max\left[\left(D_{ijk}^{-y}u + \text{switch}_{ijk}^{-y}\frac{\Delta y}{2}D_{ijk}^{-y-y}u\right), -\left(D_{ijk}^{+y}u - \text{switch}_{ijk}^{+y}\frac{\Delta y}{2}D_{ijk}^{+y+y}u\right), 0\right]^2 \\ +\max\left[\left(D_{ijk}^{-z}u + \text{switch}_{ijk}^{-z}\frac{\Delta z}{2}D_{ijk}^{-z-z}u\right), -\left(D_{ijk}^{+z}u - \text{switch}_{ijk}^{+z}\frac{\Delta z}{2}D_{ijk}^{+z+z}u\right), 0\right]^2 \end{bmatrix}^{1/2}.$$

8. The method of claim 1 wherein the grid points are arranged on a Cartesian grid.

9. The method of claim 8 wherein the grid points are arranged on a spherical grid.

10. The method of claim 1 wherein processing the seismic signals comprises generating an image of the volume.

11. The method of claim 10 wherein the image is generated by Kirchhoff migration.

12. A computer-implemented three-dimensional seismic imaging method comprising:
    a) providing accepted traveltimes for an accepted grid region of a seismic exploration volume;
    b) providing tentative traveltimes for a set of close grid points situated one grid point away from the accepted grid region, the tentative traveltimes for the set of close grid points being arranged on a heap;
    c) selecting a minimum traveltime from the tentative traveltimes, the minimum traveltime corresponding to a minimum-traveltime grid point;
    d) saving the minimum traveltime as an accepted traveltime, thereby adding the minimum-traveltime grid point to the accepted grid region;
    e) adding neighbors of the minimum-traveltime grid point which are not in the accepted grid region to the set of close grid points;
    f) computing tentative traveltimes for the neighbors using a high-order finite-difference approximation to the eikonal equation if enough accepted traveltimes are available, or a first-order finite-difference approximation to the eikonal equation otherwise;
    g) putting the tentative traveltimes for the neighbors on the heap; and
    h) employing the accepted traveltimes to generate an image of the volume.

13. The method of claim 12 wherein the image is generated by Kirchhoff migration.

14. The method of claim 12 further comprising recomputing tentative traveltimes for close grid points one grid point away from the minimum-traveltime grid point, the recomputing employing the minimum traveltime.

15. A computer-implemented three-dimensional seismic imaging method comprising:
    a) computing accepted traveltimes for grid points of a seismic exploration volume, by
        establishing a narrow band of grid points adjacent to a traveltime front at each of a plurality of positions of the traveltime front in the volume,
        establishing a heap of tentative traveltimes for the narrow band,
        saving a minimum traveltime from the heap as an accepted traveltime in a traveltime output grid, and
        advancing the front at a minimum traveltime grid point corresponding to the minimum traveltime using a high-order approximation to the eikonal equation if enough upwind accepted traveltimes are available, and using a first-order approximation otherwise; and
    b) imaging the volume using the accepted traveltimes.

16. The method of claim 15 wherein imaging the volume comprises processing a set of seismic signals for the volume by Kirchhoff migration.

17. The method of claim 15 further comprising recomputing a tentative traveltime for a grid point neighboring the minimum traveltime grid point, the recomputing employing the minimum traveltime.

18. A computer-implemented seismic data processing method comprising the steps of:
    a) providing a set of seismic signals for a target seismic exploration region;
    b) providing a velocity model for the target region;
    c) computing a set of traveltimes for the target region by providing traveltimes for grid points in an accepted grid region within the target region, and, for each target grid point for which an accepted traveltime is to be computed, determining whether enough neighboring traveltimes are available for a high-order traveltime computation operator, if enough traveltimes are available, computing a traveltime for the target grid point using the high-order operator, and if enough traveltimes are not available, computing the traveltime for the target grid point using a first-order traveltime computation operator; and d) processing the seismic signals using the set of traveltimes to characterize a propagation of the seismic signals through the target region.

19. The method of claim 18 further comprising the steps of:

a) providing traveltimes for a set of trial grid points arranged in a narrow band around the accepted grid region;

b) arranging the traveltimes for the trial grid points on a heap; and c) selecting the minimum traveltime on the heap as an accepted traveltime for the target grid point.

20. The method of claim 18 wherein computing the traveltime for the target grid point comprises employing a finite-difference solution to the eikonal equation.

21. The method of claim 20 wherein the finite-difference solution comprises a second-order approximation to a gradient term of the eikonal equation.

22. The method of claim 21 wherein the second-order approximation is $$\left[ \begin{array}{l} \max\left[\left(D_{ijk}^{-x}u + \text{switch}_{ijk}^{-x}\frac{\Delta x}{2}D_{ijk}^{-x-x}u\right), -\left(D_{ijk}^{+x}u - \text{switch}_{ijk}^{+x}\frac{\Delta x}{2}D_{ijk}^{+x+x}u\right), 0\right]^2 \\ +\max\left[\left(D_{ijk}^{-y}u + \text{switch}_{ijk}^{-y}\frac{\Delta y}{2}D_{ijk}^{-y-y}u\right), -\left(D_{ijk}^{+y}u - \text{switch}_{ijk}^{+y}\frac{\Delta y}{2}D_{ijk}^{+y+y}u\right), 0\right]^2 \\ +\max\left[\left(D_{ijk}^{-z}u + \text{switch}_{ijk}^{-z}\frac{\Delta z}{2}D_{ijk}^{-z-z}u\right), -\left(D_{ijk}^{+z}u - \text{switch}_{ijk}^{+z}\frac{\Delta z}{2}D_{ijk}^{+z+z}u\right), 0\right]^2 \end{array} \right]^{1/2}, \text{ with}$$

$$\text{switch}_{ijk}^{-x} = \left[ \begin{array}{ll} 1 & \text{if } u_{i-2,j,k} \text{ and } u_{i-1,j,k} \text{ are known and } u_{i-2,j,k} \leq u_{i-1,j,k} \\ 0 & \text{if not} \end{array} \right]$$

and $$\text{switch}_{ijk}^{+x} = \left[ \begin{array}{ll} 1 & \text{if } u_{i+2,j,k} \text{ and } u_{i+1,j,k} \text{ are known and } u_{i+2,j,k} \leq u_{i+1,j,k} \\ 0 & \text{if not} \end{array} \right].$$

23. A computer-implemented three-dimensional seismic data processing method comprising the steps of:

a) providing a set of seismic signals for a seismic exploration volume;

b) providing a velocity model for the volume;

c) generating a set of accepted traveltimes for the volume by providing accepted traveltimes for an accepted grid region within the volume, providing tentative traveltimes for a set of trial grid points arranged in a narrow band around the accepted grid region, arranging the tentative traveltimes on a heap, selecting a minimum traveltime from the heap as an accepted traveltime, thereby adding to the accepted grid region a minimum-traveltime grid point corresponding to the minimum traveltime, adding a neighbor of the minimum-traveltime grid point which is not in the accepted grid region to the set of trial grid points, determining whether enough accepted traveltimes are available for a high-order traveltime computation for the neighbor, if enough accepted traveltimes are available, computing a tentative traveltime for the neighbor using a high-order traveltime computation operator, if enough accepted traveltimes are not available, computing the tentative traveltime for the neighbor using a first-order traveltime computation operator, putting the tentative traveltime for the neighbor on the heap, and advancing the accepted grid region to generate the set of accepted traveltimes; and d) processing the seismic signals using the set of accepted traveltimes to characterize a propagation of the seismic signals through the volume.

24. A computer system programmed to perform a seismic data processing method comprising the steps of:

a) providing a set of seismic signals for a target seismic exploration region;

b) providing a velocity model for the target region;

c) computing a set of traveltimes for the target region by providing traveltimes for grid points in an accepted grid region within the target region, and, for each target grid point for which an accepted traveltime is to be computed, determining whether enough neighboring traveltimes are available for a high-order traveltime computation operator, if enough traveltimes are available, computing a traveltime for the target grid point using the high-order operator, and if enough traveltimes are not available, computing the traveltime for the target grid point using a first-order traveltime computation operator; and d) processing the seismic signals using the set of traveltimes to characterize a propagation of the seismic signals through the target region.

25. A computer-readable medium encoding instructions to perform a seismic data processing method comprising the steps of:

a) providing a set of seismic signals for a target seismic exploration region;

b) providing a velocity model for the target region;

c) computing a set of traveltimes for the target region by providing traveltimes for grid points in an accepted grid region within the target region, and, for each target grid point for which an accepted traveltime is to be computed, determining whether enough neighboring traveltimes are available for a high-order traveltime computation operator, if enough traveltimes are available, computing a traveltime for the target grid point using the high-order operator, and if enough traveltimes are not available, computing the traveltime for the target grid point using a first-order traveltime computation operator; and d) processing the seismic signals using the set of traveltimes to characterize a propagation of the seismic signals through the target region.

26. A seismic imaging apparatus comprising:

a) means for providing a set of seismic signals for a seismic exploration volume;

b) means for providing a velocity model for the volume;

c) means for computing a set of traveltimes for the volume by providing traveltimes for grid points in an accepted grid region within the volume, and, for each target grid point for which an accepted traveltime is to be computed, determining whether enough neighboring traveltimes are available for a high-order traveltime computation operator, computing a traveltime for the target grid point using the high-order operator if enough traveltimes are available, and computing the traveltime for the target grid point using a first-order traveltime computation operator if enough traveltimes are not available for the high-order operator; and d) means for processing the seismic signals using the set of traveltimes to characterize a propagation of the seismic signals through the volume.

\* \* \* \* \*

UNITED STATES PATENT AND TRADEMARK OFFICE
CERTIFICATE OF CORRECTION

PATENT NO. : 6,324,478 B1
DATED : November 27, 2001
INVENTOR(S) : Alexander M. Popovici and James A. Sethian It is certified that error appears in the above-identified patent and that said Letters Patent is hereby corrected as shown below:

<u>Column 11,</u>
Line 46, after "The method of claim," replace "8" with -- 1 --.

Signed and Sealed this

Thirtieth Day of April, 2002

*Attest:*

JAMES E. ROGAN
*Director of the United States Patent and Trademark Office*

*Attesting Officer*